United States Patent Office 3,305,342
Patented Feb. 21, 1967

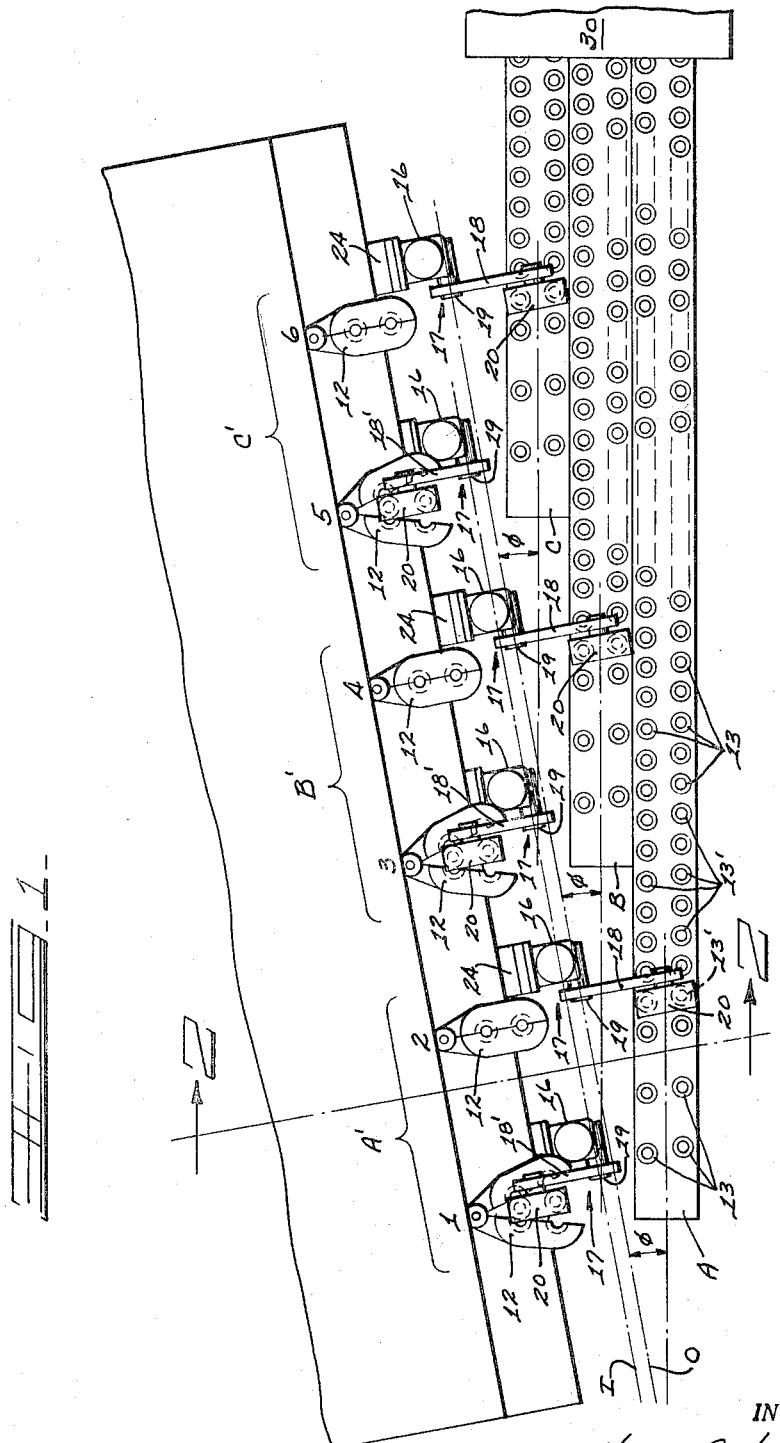

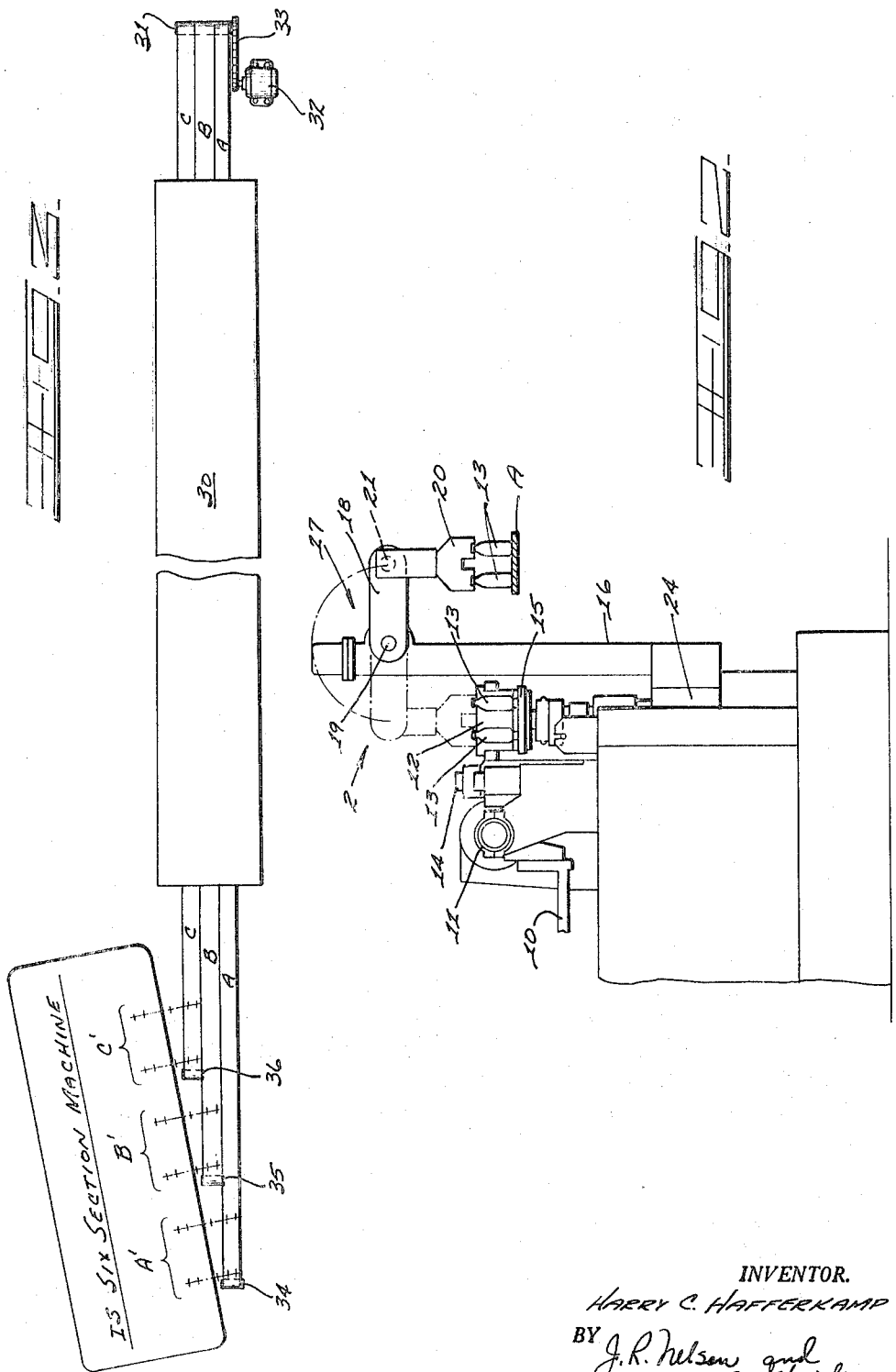

3,305,342
METHOD AND APPARATUS FOR HANDLING HOT, DEFORMABLE GLASSWARE
Harry C. Hafferkamp, Toledo, Ohio, assignor to Owens-Illinois, Inc., a corporation of Ohio
Filed May 22, 1962, Ser. No. 196,701
5 Claims. (Cl. 65—260)

The present invention relates to an improved apparatus and method for handling articles of glassware from a forming machine and annealing or heat treating same with a minimum of handling both at an increased production rate. The invention, as disclosed herein, is an improvement over the copending application of Guy H. Allgeyer, Serial No. 740,020, filed June 5, 1958, now Patent No. 3,066,786; and Serial No. 829,645, filed July 27, 1959, now Patent No. 3,066,787, both of which are owned by the assignee of the present application.

In transferring glassware from a forming machine, it is axiomatic that the formed articles of ware are handled initially while in a hot, and deformable condition, such that, at the time the final forming mold frees the article for transfer, it is on the order of about 1300° to about 1450° F. In such hot condition, the glass of the formed article is plastic or semiplastic and deformable. It is thus subject to irreparable damage if chilled locally by substantial cold iron contact or if two or more articles come into surface contact while in this condition, they will stick or weld to each other. Also, severe handling in transferring the ware from the forming machine to later treatment; such as annealing, for example by skidding or sliding the ware across supporting or relatively cold metal guide deflector surfaces, this will impart chills, scratches or mars to the surface areas of the ware that will later weaken or ultimately render a large number of the articles in weakened condition such that they will be unfit for ultimate usage.

Thus, it is an important object of the present invention to provide a method and apparatus for handling glassware in transferring it from the forming machine where it is made through an annealing treatment where it is heat treated with a minimum of contact with other objects, and especially to avoid skidding or sliding the ware on or against any of the machinery which handles or processes it during this time of the production.

Prior to the Allgeyer inventions, the forming machine sections of an I.S. machine delivered their formed ware onto a machine conveyor in but one or two lines, respectively, depending on whether the machine was producing the ware by single or double gob production. This conveyor, to keep pace with machine production, traveled at a relatively high speed. Thus, in order to anneal the ware in a reasonably short lehr, the single or double line arrangement needed to be oriented into multiple lines and placed on the slower moving lehr conveyor. This required the above-referred to objectionable handling of the ware while in the hot condition. Therefore, in achieving the stated object of the invention, a certain relationship between the forming machine and the annealing lehr need be observed, that is, the lehr belt or conveyor must pass beside the forming machine to receive the ware in multiple rows and then without further handling convey it into an annealing tunnel that is in close proximity to the machine where it is heat treated. The invention therefore includes as an object the provision of a novel combination of elements which achieves this purpose, but also maintains a reasonably short transfer from the mold to the lehr conveyor. In machines for making bottles, jars and like containers of glass, plural forming units or sections, such as the known Hartford-Empire I.S. (individual section) machine are utilized which operate collectively to supply ware to a single annealing lehr unit.

In the prior mentioned inventions of Allgeyer, the single lehr conveyor received all the ware from the plural sections of the forming machine, and, in order to load the ware from the machine directly onto the conveyor in multiple rows, the swinging-type transfer units of some of the machine sections required that relatively long arms be used. The swinging type transfer units employ a pivoted transfer arm that is swung in controlled fashion by a drive means between a position at the forming mold and a position over the lehr conveyor. These longer transfer arms by virtue of their relative size and the distance over which they transfer the ware, placed a speed limitation on the transfer rate or speed of transfers of the machine sections, and thereby place a limitation on the machine production rate.

This invention provides for operating these multiple sections of the machine in pairs and the lehr is provided with a new system of conveyance wherein plural side-by-side conveyors of unequal length serve these pairs of sections in receiving the ware therefrom and handling it through the annealing process. This provides the advantage, which is in addition to the minimum space requirement on the location and length or size of the lehr, mentioned above, enabling the use of the swinging type transfer units that include oscillatory, pivoted transfer arms that are of relatively short length.

It is accordingly one of the important objects of this invention to provide a combination of a machine and lehr wherein the transfers from machine mold to lehr are over relatively shorter distances, that is shorter transfer arms are utilized, and transfers are accomplished at higher rates in transferring ware from the plural section machine directly to the lehr conveyor in the aforementioned fashion of a minimum of handling of the ware.

In fulfilling the objectives of the invention, a novel glassware annealing lehr structure is provided wherein an annealing lehr tunnel receives plural side-by-side parallel endless conveyors, each having end mountings for continuously moving the conveyors through the lehr tunnel. The conveyors are driven by a common drive from the one end mounting and the opposite end mountings for each conveyor are individual which readily permits variation of length of the several lehr belts.

Other objects of the present invention, aside from those stated above, will be apparent from the reading of the herein included description of the invention, the appended claims, and the accompanying drawings of said embodiment to which reference is made and in which:

FIG. 1 is a partial plan view showing a six-section I.S. glass forming machine operated in conjunction with the novel annealing lehr of the invention;

FIG. 2 is a side sectional elevational view taken along line 2—2 on FIG. 1; and

FIG. 3 is an overall schematic plan view of the forming machine and novel annealing lehr combination including the annealing lehr conveyors A, B and C and their drive means.

Before specifically describing the herein illustrated embodiment of the invention depicted on the accompanying drawings, the invention will be described in terms of the basic combination of the invention.

The unit includes a plural section I.S. machine, such as a six-section machine, that is installed under a glass gob forming and supplying feeder mechanism of desired and known type. The machine sections are assembled on the machine frame in an aligned relationship so that the final forming mold units thereof lie along a common vertical plane. The annealing lehr is arranged to extend at a minimum acute angle with relation to the mentioned plane of the alignment of the sections of the machine and the lehr includes multiple parallel conveyors which are of progressively increased length and extend along side of separate successive pairs of the forming mechanisms on the machine. In the six-section I.S. machine, three separate lehr conveyors in parallel, side-by-side relationship are used. The three lehr belts are all connected to a common drive means at the far end which operates them in unison to convey transferred glassware through the annealing tunnel at the desired common speed. Referring to FIG. 1, the six-sections are consecutively numbered left to right 1 through 6, the pair of sections 1 and 2, identified on the drawing as pair A', deliver their glassware to the outside conveyor A, the pair of sections 3 and 4, identified as pair B', deliver their ware to the middle conveyor B, and the last pair of sections 5 and 6, identified as pair C', deliver their ware to the inside conveyor C. The transfers are such that they are made every half machine-cycle apart. Adjacent sections, such as 1 and 2, should not be delivering ware to the conveyor consecutively because of a possible gob scoop interference inherent on the six-section I.S. machine. In order to deliver the ware from the sections at equal intervals, yet avoid transfers from adjacent sections consecutively, it has been found that there are two firing orders for machine section transfers in the six-section machine which may be used. They are consecutive transfers from sections 1–3–5–2–4–6, or consecutive transfers in the order of sections 1–6–4–2–5–3. For sake of simplicity of illustration, the drawing on FIG. 1 shows the arms of the sections alternately in their extreme positions of the transfer cycle. It should be understood, however, that in actual operation the transfers would be made by either of the above firing orders for a six-section machine to meet the scoop interference problem.

The conventional spacing between sections of the I.S. machine is 21″ measured in the plane of the alignment of the sections on the machine. Spacing of the bottles by transfers from a pair of sections, such as 1 and 2, as the ware is delivered to the corresponding conveyor, such as A, may be regulated as desired by combination of the timing on the machine and the speed of the conveyors. The size of the bottle being produced will, of course, determine the minimum spacings between transfers for a given lehr conveyor speed without creating bottle interference.

The takeout arms on the takeout and transfer devices of the machine are constructed to be alternately of different length, one to the other, so that alternate sections, such as 1, 3 and 5, utilize one length of takeout arm 18′. In the example of the machine shown in FIG. 1 of the drawings, the machine being operated double gob on a given bottle size, the radius of the shorter transfer arm 18′ is about $7^{11}/_{16}″$. The other or even numbered sections, that is, 2, 4 and 6, have somewhat longer takeout arms 18. In the example given by the disclosure, the longer transfer arms 18 have a radius of about $9^{11}/_{16}″$. These examples are valid for a range of job sizes of bottles.

Referring to FIG. 2, the final or blow mold side of the I.S. machine of one section, for example section No. 2, is shown. It includes an invert arm 10 which is pivoted about an invert trunnion 11 and carries a neck ring (not shown) which transfers successively parison shapes of glass into the final blow molds 12. The final blow molds 12 may be of single cavity or multiple cavity types, the multiple cavity type being shown on the drawings wherein glassware is finally blown to shape in pairs. The finally formed glassware 13 is disposed in this forming mold in an alignment that is perpendicular to the alignment of the final molds of the machine sections 1–6. The final blow molds 12 are opened and closed about a hinge pin 14 in accordance with a timed operational cycle of each of the machine sections to form the finished containers supported on the mold bottom plate 15. When the molds are open, the containers 13 set in an upright position with their central axis vertical and spaced apart by a fixed center distance.

Each machine section 1–6 includes a vertical standard or frame 16 which mounts an oscillatory transfer tongs unit referred to generally at 17. Each transfer unit includes a transfer arm 18 or 18′ that is pivoted at one end on a shaft 19 and at its outer end a set of ware transfer tongs 20 is pivotally mounted at 21. In the present invention, the upright frame 16 of the transfer units on sections 1, 3 and 5 are mounted on the frame of the machine at the same location so that their transfer units 17, when viewed in plan as on FIG. 1, lie along a line parallel to the mold alignment on the machine. The transfer unit frames 16 are thus bolted or otherwise secured directly onto the machine frame. The upright frames 16 of the other sections 2, 4 and 6 lie along a common line that is parallel with the alignment of the machine sections. As it will be noted from the drawings (FIG. 1), the machine sections are grouped as pairs A', B' and C', i.e., sections 1–2; 3–4 and 5–6. The transfer arms 18 of sections 2, 4 and 6 are of greater length than the corresponding transfer arms indicated as 18′ of the sections 1, 3 and 5. These transfer unit frames 16 are located by a spacer member 24 between it and the machine frame. This provides the correct horizontal span for operating the longer arms 18 of the transfer unit so that the tongs will register with the ware formed in the mold at the mold position in the transfer cycle. Thus, swinging axes or pivots 19 for the sections 1, 3 and 5 lie along one parallel alignment with the machine sections, indicated at line I, and the pivots 19 for the sections 2, 4 and 6 are along another parallel line, indicated at line O, spaced outwardly from the line I (FIG. 1). If the transfer arms are changed to provide a different length, the spacers 24 will of course be also changed to provide the proper spacing of the mounting for the transfer units 17.

The transfer devices 17 of the machine sections 1–6 are driven in oscillatory cycles between the ware receiving position over the mold bottom plate 15 of the machine and a ware delivery position over the lehr conveyors A–C. The swinging transfer units are operated by the drive mechanism of each of their machine sections, in the fashion above described, and by the timing apparatus which is a part of the I.S. machine and need not be herein specifically described.

The lehr of the present invention includes a lehr tunnel structure 30 which is provided with the usual heating section and cooling section for bringing glassware articles that are conveyed therein up to an annealing temperature in the neighborhood of 1000°–1100° F. and thereafter cooling these articles in controlled manner down to a handling temperature. In the present invention this is accomplished while the glassware is conveyed on the separate conveyors A, B and C that extend through the lehr tunnel 30.

Each of the conveyors A, B and C are of the endless belt variety and are rotatably supported on one end by a common shaft 31 which is provided with conveyor drive means and a driven gear. This shaft through its driven gear is coupled to a power drive means, such as motor 32, which drives the conveyor shaft 31 through the chain drive 33. The three conveyors A, B and C are thus connected to travel in unison through lehr tunnel 30. The other end of the conveyors A, B and C are independently mounted on shafts 34, 35 and 36 which are located at different distances from the end shaft 31 thus, the three conveyors shown on the drawings are of progressively increasing length taken C to A, as they extend along side the respective pairs C'–A', respectively, of the sections of the forming machine. The lehr and its conveyors are arranged with a specific disposition in mind in relation to the planar alignment of the forming molds 12 on the forming machine sections. The center lines of each of the three conveyors A–C are shown on the drawing extended as they define the angle $\phi$ between the alignment of the machine sections and the conveyors. As was indicated earlier, the angle formed by this intersection (angle φ) is selected as an acute angle to perform the desired transfer of the ware from the machine sections onto the respective lehr belt conveyors in achieving a desired spacing between the bottles, yet provide the installation with a minimum length of the longer transfer arm 18, mentioned earlier. As a specific example under the condition of operation, shown on FIG. 1, angle φ is approximately 11°. This value of angle φ is selected for a particular size job and length of the transfer arms 18.

In operation, considering the forming sections indicated on FIG. 1 as pairs, the belt A has a linear speed synchronized with the rate of forming the ware on the pair of machine sections A'. This speed is selected so that each pair of containers 13 delivered by the transfer unit 17 of machine section 1 will be placed on the conveyor belt A at a spacial alignment the same as their alignment on the forming mold bottom plates 15. The transfer will dispose them laterally over conveyor A and somewhat angled thereacross (FIG. 1). The spacing between successively transferred pairs of containers 13 from section 1 will be such that successively deposited pairs from this forming section will be spaced on conveyor A an amount in excess of the size of the ware that is being formed and transferred to conveyor A from the other section (2) of the pair A'. Then, as the ware is transferred in pairs indicated as 13' by transfer unit 17 of section No. 2, this ware will be set in this space provided between transfers from the section No. 1. This same operational procedure is also carried out by the forming sections of the pairs B' (3–4) and C' (5–6). Thus, in double gob operation, two rows of ware are formed in single file relationship on each of the plural conveyors A–C which extend into and through the annealing lehr. Although it is not illustrated on the drawings, a staggered arrangement may be achieved by changing the angular relationship of the conveyors or the length of the transfer arms 18 and 18', as between any pairs of the forming sections. Also, when the machine is operated single gob, a single file row or staggered arrangement of the ware in the rows may be achieved, as desired.

In the foregoing description of the invention, only those parts as are modified from the standard I.S. machine are specifically described and mentioned. Also, in the foregoing description the same reference numerals are used wherever an identity of parts of the machine mechanism exist.

In practicing the present invention, the ware forming sections are considered in pairs, and the corresponding conveyor for each pair of sections is adjusted to some acute angle with respect to the machine sections. This angle is selected to be as small as possible depending upon the bottle size and the mold cavity center distances, and allowing for desired spacing of the ware on the conveyor after it is transferred such that interference between bottles is eliminated as well as any need for further orientation after the ware is finally transferred and deposited on the conveyors. This also takes into account a desired lehr mat speed to achieve annealing within as short a physical space as is practical.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. In combination, a plural-section glass forming machine with the final molds thereof spaced along a common vertical plane, an annealing lehr spaced from the final molds for receiving and annealing glassware, plural, parallel endless conveyors disposed to travel through said lehr, the conveyors being of progressively increasing length in their lineal extent outwardly from the point of entry into the lehr to their ends adjacent the forming machine, the longitudinal center line of each of said parallel conveyors being disposed at the same acute angle with respect to said common vertical plane of the final molds, and means on each of said sections of the machine for transferring the ware in a vertical plane disposed at right angles to said common vertical plane from said final forming mold thereof to a point overlying one of said plural conveyors, said means being operated to release glassware transferred thereby from their respective final molds onto said one of the plural conveyors.

2. The combination defined in claim 1, wherein said forming machine has twice the number of forming machine sections as there are plural, parallel conveyors, and said plural conveyors are mounted to run over guide means that are carried on individual, freely rotatable shafts about which the conveyors reverse their endless movement, these shafts being disposed parallel and in horizontally staggered array with respect to the forming machine and disposed at the one end of each said conveyor adjacent said forming machine and thence over a rotary drive means including a shaft at the other end of each said conveyor, the said drive means providing a common drive for the said shafts at the said other end of all said conveyors.

3. The combination defined in claim 2, wherein said means for transferring the ware comprises a ware transfer device at each ware forming section having a transfer arm pivoted about a horizontal axis, and ware gripping means at the outer end of each of the transfer arms operated for gripping and transferring ware upon movement of the arm from the final molds of the machine section to a location overlying the conveyor for said section, the transfer arms of alternate sections of the machine being of one length and the other transfer arms are of a common length longer than said one length such that ware transferred from any two adjacent sections of said machine to one of said conveyors are disposed at alternate short and long transfer points thereon, the ware transferred from adjacent sections to said conveyor being placed in common rows thereon.

4. The combination defined in claim 3, wherein the forming machine comprises six sections and said plural parallel conveyors are three in number, whereby two adjacent sections of the machine transfer their ware varying distances from their molds to one of said conveyors and place said ware in common rows thereon.

5. The combination of claim 3, wherein each of the adjacent forming sections have plural cavity molds which form corresponding plural articles of glassware simultaneously, the transfer devices of adjacent sections placing the ware in corresponding plural rows according to the cavity of each in which the ware was formed.

References Cited by the Examiner

UNITED STATES PATENTS 3,066,787  12/1962  Allgeyer _____ 198—30
3,104,753   9/1963  Osborne _____ 198—30

DONALL H. SYLVESTER, *Primary Examiner.*

S. LEON BASHORE, *Examiner.*

D. CRUPAIN, *Assistant Examiner.*